United States Patent [19]

Kawabe et al.

[11] Patent Number: 5,404,456
[45] Date of Patent: Apr. 4, 1995

[54] CONTROLLED METHOD OF OPERATING A PROGRAMMABLE CONTROLLER WITH A MULTI-LEVEL STAGE CONFIGURATION

[75] Inventors: Katsunori Kawabe; Katsuji Toyooka, both of Tokyo, Japan

[73] Assignee: Koyo Electronics Industries Co., Ltd., Tokyo, Japan

[21] Appl. No.: 861,979
[22] PCT Filed: Nov. 6, 1990
[86] PCT No.: PCT/JP90/01438
  § 371 Date: Jun. 30, 1992
  § 102(e) Date: Jun. 30, 1992
[87] PCT Pub. No.: WO92/08171
  PCT Pub. Date: May 14, 1992
[51] Int. Cl.$^6$ ............................................. G06F 15/46
[52] U.S. Cl. .................. 395/275; 364/DIG. 2; 364/926.93; 364/949
[58] Field of Search ........................... 395/650, 275

[56]  References Cited
U.S. PATENT DOCUMENTS
4,648,064 3/1987 Morley ................ 364/DIG. 2

FOREIGN PATENT DOCUMENTS
56-168214 12/1981 Japan .
60-215213 10/1985 Japan .
60-235204 11/1985 Japan .
61-204704  9/1986 Japan .
1-9503  1/1989 Japan .

Primary Examiner—Thomas M. Heckler
Attorney, Agent, or Firm—Michael N. Meller

[57] ABSTRACT

A controlled method of operating a programmable controller containing a program storage section including memory means in which a plurality of programs are stored with each program having a master reset flag and corresponding to a stage consisting of one or more control programs for performing control functions when the control programs in each stage are executed. In accordance with the method, a series of programs each corresponding to a stage is read out from the memory means with the control programs of each stage executed when both a master reset flag for a stage, which is reset in initialization, and a stage status corresponding to each of the read out stages meet a predetermined relationship. When executing a control program, a status for a subsequent macro-block is set or reset. The macro-block consists of a plurality of stages. When the status of the macro-block is set, the master reset flag for a stage is subsequently reset at the beginning of the macro-block. When the status of the macro-block is reset, the master reset flag for a stage is subsequently set at the beginning of the macro-block. A plurality of stages included in the macro-block are then executed provided that the status of the macro-block is set and the master reset flag for a stage is reset.

3 Claims, 6 Drawing Sheets

|  |  |  |  |
|---|---|---|---|
|  |  | MLBL | M100 |
| iSG | S10 | SG | S100 |
| LD | i0 | LD | i2 |
| JMP | S11 | JMP | S101 |
| MSG | S11 | SG | S101 |
|  | M100 | OUT | Q11 |
| LDN | M100 | LD | i3 |
| JMP | S12 | JMP | S102 |
| SG | S12 | SG | S102 |
|  |  | LD | i4 |
|  |  | MEND |  |

FIG. 5

CONTROLLED METHOD OF OPERATING A PROGRAMMABLE CONTROLLER WITH A MULTI-LEVEL STAGE CONFIGURATION

TECHNICAL FIELD

The present invention relates to a programmable controller, and particularly relates to control on a system which is in a relationship of subordination to a certain system.

BACKGROUND ART

In a conventional programmable controller (hereinafter abbreviated to "PC"), for example, as disclosed in Japanese Patent Post-Examination Publication No. Hei-1-50923, stage numbers, logical operations, data operation commands, timer commands, etc. have been provided so that judgment is made as to whether a status of a stage in question is set or reset so as to make control on every controlled unit specified by the stage.

However, in the case of controlling stages (lower-level stages) of a system which is in a relationship of subordination to a certain stage (higher-level stage), for example, in the case where lower-level stages are naturally reset when a higher-level stage is in a reset state, it is necessary to provide commands to reset the respective lower-level stages individually. In that case, stage numbers of the lower-level stages have no rules and are scattered, and the number thereof is so large that it has been apt to make a mistake at the time of stating a command. Further, there has been a problem that it is difficult to understand the relationship of subordination at a glance of a program.

DISCLOSURE OF THE INVENTION

The present invention has been attained to solve the foregoing problems and an object thereof is to provide a PC in which it is possible to make control commands for lower-level stages easily, it is also possible to grasp a relationship of subordination, and it is further possible to realize a multi-level configuration.

According to an aspect of the present invention, the PC comprises a stage table for storing statuses of respective stages and macro-blocks respectively, an I/O table for storing input/output data, a register for storing a master reset flag for a stage, a result register for storing results of operation, a program storage unit for storing a user program, and an operation control unit for analyzing and executing the user program, the program storage unit storing at least a higher-level program including the following commands (A) and (B), and programs for a first lower-level macro-block including the following programs (C), (D) and (E):

(A) State commands SG each having a stage number stated therein and for obtaining an AND logic between an inverted signal of a master reset flag for a stage and a status of a corresponding stage, and a group of various commands each stated after a stage command SG, a program of each of the various commands being executed when a status of the corresponding stage is set;

(B) Macro stage commands MSG in each of which a stage number and a macro-block number are stated, and each of which is for obtaining an AND logic between an inverted signal of a master reset flag for a stage and the status of the stage, and for setting a result of the ANDing into the status of the stage as well as into the status of the macro-block;

(C) Macro-label commands MLBL each of which is stated at the beginning of a program of a macro-block, and is for resetting a master reset flag for a stage and for setting the status of the stage command SG stated next thereto when the status of the macro-block is set;

(D) Macro-end commands MEND each of which is stated at the end of a program of a macro-block, and is for resetting the status of the macro-block when the result register is set; and (E) The command group of the commands (A) stated between the macro-label commands MLBL and the macro-end commands MEND.

In the PC according to another aspect of the present invention, the programs for the first lower-level macro-block include the programs of the commands 1B), and the programs for a second lower-level macro-block include the programs (C), (D) and (E). The status of a third macro-block is controlled by the programs for the first lower-level macro-block. That is, a second lower-level macro-block controlled by the first-lower level macro-block can be obtained, so that the programs are of a three-level configuration.

Further, in the PC according to another aspect of the present invention, the program storage unit stores programs for macro-blocks of a plurality of lower-levels including contents similar to the programs for the second lower-level macro-block, and the statuses of those lower-level macro-blocks are controlled by the program for a relatively higher macro-block so that it is possible to obtain a multi-level configuration having a desired number of levels.

In the above-mentioned PC, the status of the macro-block in the program of the first lower-level macro-block is controlled by the higher-level program, and, further, a master reset flag for a stage is controlled by the status of the first lower-level macro-block. For example, if the status of a macro-block is set, the master reset flag for tile stage of the macro-block is reset, so that operation control on the program of the macro-block is executed. Such a relationship between programs for a higher-level macro-block and for a first lower-level macro-block is also established between programs for first and second lower-level macro-blocks. Such a relationship can be desiredly constituted, so that it is possible to constitute a multi-level configuration easily.

Further, in the PC according to another-aspect of the present invention, the programs of respective levels are made to include a plurality of macro-stage commands MSG for controlling the programs of macro-blocks in lower levels, so that it is possible to use the programs of the lower-level macro-blocks as subroutines.

As has been described above, according to the present invention, lower levels are controlled by every macro-block by use of a stage command, an SGRST, a macro-stage command, a macro-label command and a macro-end command, and the every macro-block is controlled on the basis of a macro-stage command on a higher-level side, so that it is possible to realize a multi-level configuration easily, and it is possible to grasp the relationship of the multi-level configuration easily.

BRIEF DESCRIPTION OF DRAWINGS

FIG. 5 is a diagram illustrating each status when the user program in FIG. 3 is executed.

BEST MODE FOR CARRYING OUT THE INVENTION

Figure 1:
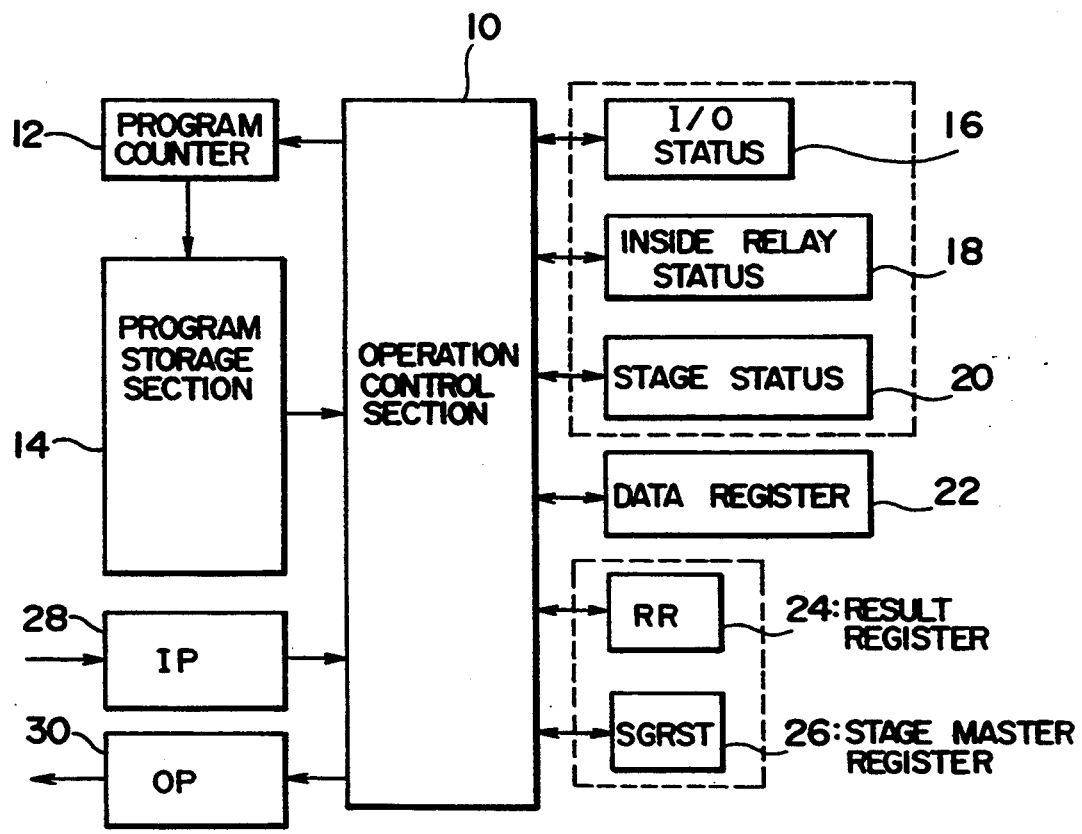
FIG. 1 is a block diagram illustrating a hardware structure of a PC which is an embodiment of the present invention.

FIG. 1 is a block diagram illustrating the configuration of the PC according to an embodiment of the present invention. In FIG. 1, the reference numeral 10 represents an operation control unit for processing various operations, and 12 represents a programmable counter for counting on the basis of instructions from the operation control unit 10. The reference numeral 14 represents a program storage unit in which user programs are stored, and from which a program having the address assigned by a count value of the programmable counter 12 is read into the operation control unit 10. The reference numeral 16 represents an I/O table for storing I/O statuses, in which input data i0, i1 ... and output data Q1, Q2 ... are stored. The reference numeral 18 represents an internal relay table for storing, for example, temporary data and so on. The reference numeral 20 represents a stage status table for storing statuses of respective stages and macro-blocks, and 22 represents a register for storing various data. The reference numeral 24 represents a result register (hereinafter abbreviated to "RR") for temporarily storing the results of operation of the operation control unit 10. The reference numeral 26 represents a one-bit register for storing a master reset flag for a stage.

The reference numeral 28 represents an input port for storing input data into the I/O table through the operation control unit 10. The reference numeral 30 represents an output port for outputting output data of the I/O table 16 through the operation control unit 10.

Figure 2:
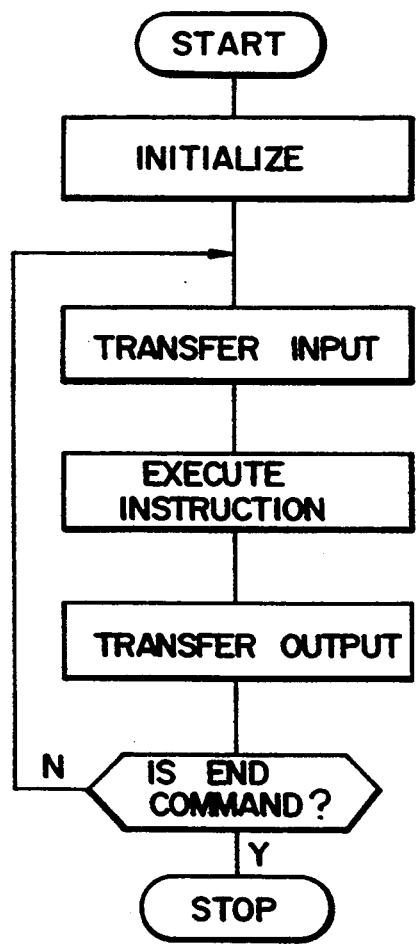
FIG. 2 is a flowchart illustrating the operation of the PC.

FIG. 2 is a flowchart illustrating the operation of the PC of FIG. 1. As illustrated, first the operation control unit 10 performs initialization such as resetting of a master reset flag for a stage (hereinafter abbreviated to "SGRST"), and next performs input transfer. Herein the input transfer means taking input data from an input module (not-shown) into the I/O table 16 through the input port 28. All the input data are taken into the I/O table 16.

Next, the operation control unit 10 reads a program of the address assigned by the programmable counter 12 from the program storage unit 14 sequentially, analyzes the program, and performs various operations on the basis of the result of analysis. For example, the operation control unit 10 performs operation on the basis of input data of the I/O table 16 or data of the data register 22, and stores the result of operation into the I/O table 16 or the internal relay table 18.

Upon completion of the operation on all the user program, the operation control unit 10 performs output transfer. Herein the output transfer means supplying output data stored in the I/O table 16 to an output module (not-shown) through the output port 30.

The operation control unit 10 repeats the above-mentioned input transfer, instruction execution and output transfer cyclically till an end command is given.

Various programs are executed in the program analysis and operation processing in the above-mentioned operation execution. Next, programs peculiar to the present invention will be described.

(A) Stage Command SG, iSG;

For example, SG S10

An AND logic between an inverted signal of the SGRST and a status ST of a corresponding stage is obtained, and set into the status ST. In this example, the result of ANDing is set into a status ST of a stage S10.

In the command iSG, a status ST of a corresponding stage is set to "1" in advance at the time of initialization in FIG. 2, and the same operation as SG is performed at the time of executing the command.

(B) Macro Stage Command MSG;

For example, S11 M100

(1) An AND logic between an inverted signal of the SGRST and a status ST of a corresponding stage is obtained, and set into the status ST. In this example, the result of ANDing is set into a status ST of a stage S11.

(2) Further, the set content of the status ST is set into a status ST of a macro-block. In this example, the content of the status ST of the stage S11 is set into a status ST of a macro-block M100.

(C) Macro Label Command MLBL

For example, MLBL M100

When a status of a corresponding macro-block has been set to "1", the SGRST is reset, and a status ST of a stage of a stage command SG stated next is set to "1" at the same time. Further, when the status ST of the corresponding macro-block has been reset, the SGRST is set to "1".

(D) Macro End Command MEND

When "1" has been set in the RR 24, a status ST of a corresponding macro-block is reset.

Figures 3, 4:
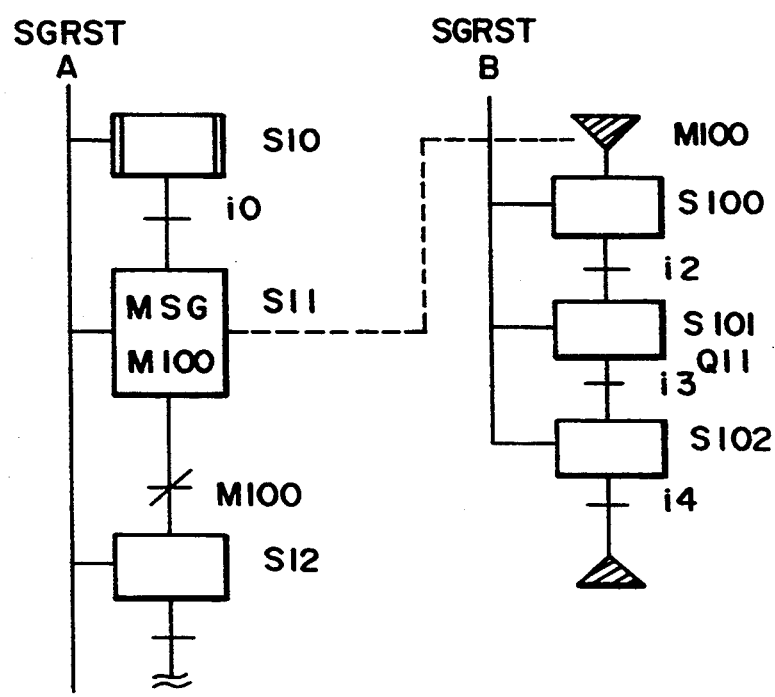
FIG. 3 is a diagram illustrating a portion of a user program stored in a user program storage unit in FIG. 1.
FIG. 4 is a flowchart conceptually illustrating the operation of the program in FIG. 3.

FIG. 3 is a diagram in which a part of a user program stored in the program storage unit 14 is listed, and FIG. 4 is a diagram conceptually illustrating the user program.

(1) iSG S10; By this command iSG, an AND logic between an inverted logic of the SGRST and the status ST of the stage S10, which has been set to "1" in advance by the initialization, is obtained, and set into the status ST of the stage S10. Herein since the SGRST has been reset by the initialization after turning-on of a power supply, "1" is set into the status ST of the stage S10.

(2) LD i0; By this command LD, the input data i0 of the I/O table 16 is stored into the RR 24.

(3) JMP S11; In this command JMP, nothing is processed when the RR 24 has been reset. When "1" has been set in the RR 24, a status ST of a stage including this command JMP (the status of the stage S10 herein) is reset, and "1" is set into a status ST of a stage to be an operand of the command JMP (the status of the stage S11 herein) at the same time.

For example, assume now "1" has been set in the input data i0 in the above-mentioned processing, and the RR 24 is in the state of being set to "1", so that the command JMP is effective, the status ST of the stage S10 is reset, and "1" is set into the status ST of the stage S11.

(4) MSG S11 M100;

Herein since the status ST of the stage S11 has been set to "1", and the SGRST has been reset, the AND logic between an inverted signal of the SGRST and the status ST of the stage S11 becomes "1", so that "1" is set into the status ST of the stage S11. Further, "1" is set into the status ST of the macro-block M100 on the basis of the content ("1") of the status ST of the stage S11.

If the AND logic between the inverted signal of the SGRST and the status ST of the stage S11 is "0", the status ST of the stage S11 is reset, and the status ST of the macro-block M100 is also reset.

Although the program is executed sequentially thereafter, the description of a part of the program processed thereafter will be omitted, and the description about the program of a macro-block in the right of FIG. 3 will be continued.

(5) MLBL M100;

Since the status ST of the macro-block M100 has been changed from "0" to "1", the SGRST is reset thereby, and "1" is set into a status ST of a stage of a stage command described in the next address, that is, the stage S100 herein. Consequently the processing on the stage S100 et seq. is made possible, and is performed in the same manner as mentioned above. The description is therefore omitted.

If the status ST of the macro-block M100 has been reset, the SGRST is set. When the SGRST has been set, the statuses ST of SG100 et seq. are reset, so that commands of the stage command SG100 et seq. stated in the next address are left without being executed. In this example, the stage commands of stages S100 to S102 are not executed.

(6) MEND

When "1" has been set in the RR 24, the status ST of the present macro-block is reset. Consequently the processing of this macro-block is finished. In this example, when the previous command "LD i4" is executed, the status ST of the macro-block is reset in the condition that input data i4 of the I/O table 16 has been set to "1".

Figure 5:
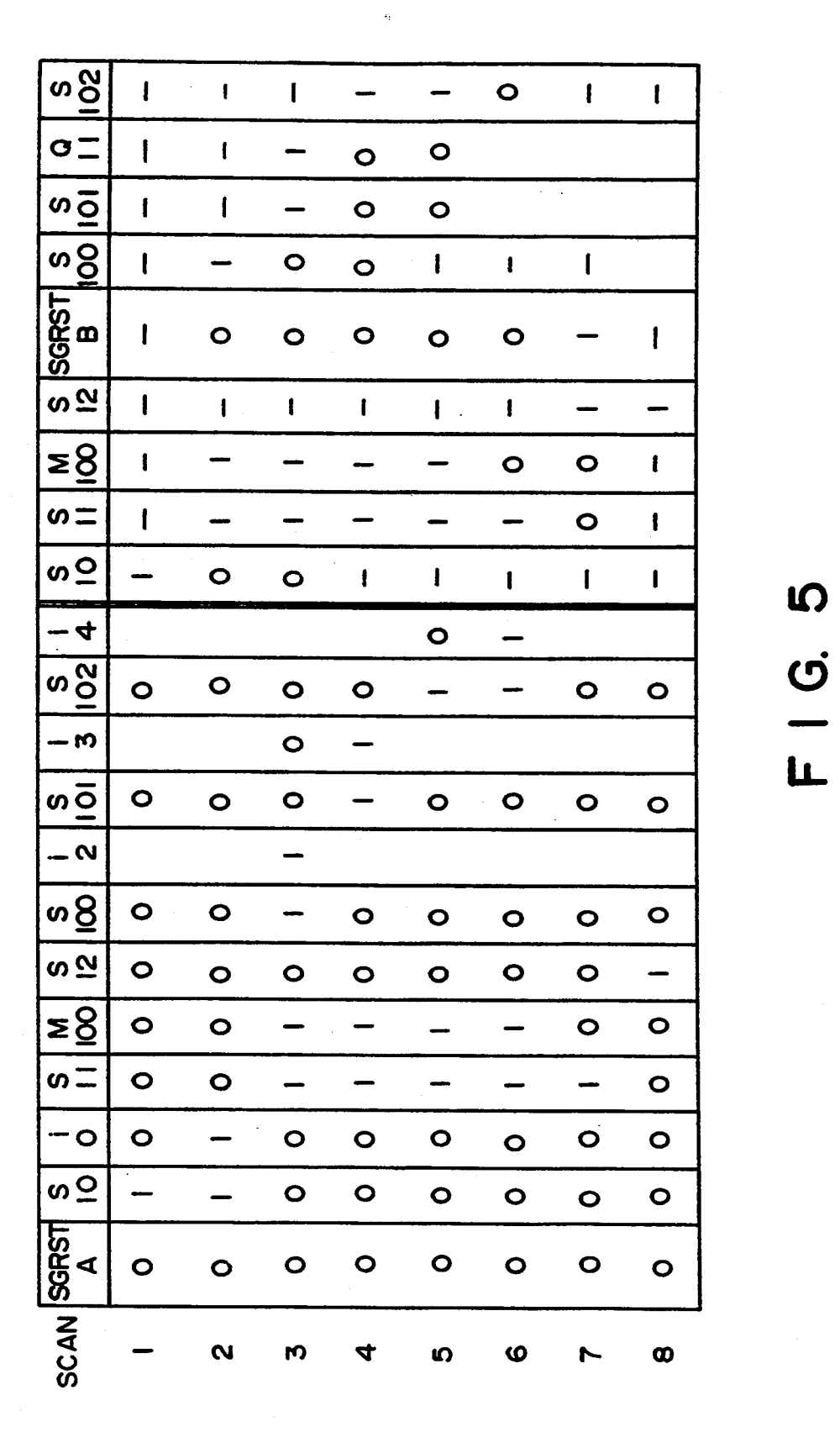

FIG. 5 is a diagram illustrating input data and data of respective portions when the program in FIG. 3 is executed, and the description thereof will be made more specifically in the order of respective scannings.

(1) Scanning (1);

By the command iSG S10, the status ST of the stage S10 has been set to "1" in advance by the initialization. Assume there is no input data at this time.

(2) Scanning (2);

If "1" has been set in the input data i0 of the I/O table 16, the command "JMP S11" is executed to reset the status ST of the stage S10, and "1" is set into the status ST of the stage S11. Then the command "MSG S11 M100" is processed. By this processing, "1" is set into the status ST of the macro-block M100. And "1" is set into the status ST of the stage S100 by the command "MLBL M100".

(3) Scanning (3);

At the time of this scanning, "1" has been set in the respective statuses ST of the stages S11 and S100, and "1" is left as it is set in the status ST of the macro-block M100. In this state, if "1" is set into the input data i2 of the I/O table 16, processing is performed as follows.

Since "1" is left as it is set in the statuses ST of the stage S11 and the macro-block M100 and "1" has been set in the input data i2, "1" has been set into the RR 24 by the command "LD i2". Therefore, by the command "JMP S101", the status ST of the stage S100 is reset, and "1" is set into the status ST of the stage S101.

Further, by the command "OUT Q11", the content of the RR 24 is supplied to the output data Q11 of the internal relay table 18, and "1" is set into the output data Q11 at this time.

(4) Scanning (4);

When the input data i2 of the I/O table 16 is reset and "1" is set into the input data i3, the status ST of the stage S11 is left to be set, and the status ST of the macro-block M100 is also left to be set, but the RR 24 is reset by executing the command "LD i2".

Further, since the input data i3 has been set to "1", "1" is set into the RR 24 by the command "LD i3", the status ST of the stage S101 is reset by the command "JMP S102", and the status ST of the stage S102 is set to "1".

(5) Scanning (5);

Due to the changing of the SG101 from "1" to "0", the RR 24 is reset, and the output data Q11 is reset by the command "OUT Q11".

(6) Scanning (6);

When the input data i4 is set, "1" is set into the RR 24 by the command "LD i4". Consequently the command "MEND" is executed, and the status ST of this macro-block M100 is reset.

(7) Scanning (7);

Since "1" has been set in the status ST of the stage S11, and "0" has been set in the status ST of the macro-block M100 in the previous scanning, "1" is set into the RR 24 by the command "LDN M100", the status ST of the stage S11 is reset by the command "JMP S12", and "1" is set into the status of the stage S12. Then, since the status of the macro-block M100 has changed from "1" to "0" in the execution on the command "MLBL M100" in this scanning, "1" is set into the SGRST. Therefore, operation on the respective stages of the stage S100 of the macro-block et seq. are not processed.

As has been described, the status ST of the macro-block M100 is set or reset by a higher-level program such as the command "MSG S11 M100" or the like, and the SGRST is reset or set thereby, so that starting or stopping of the macro-block is controlled.

Although a two-level configuration is described in the above-mentioned embodiment, it is possible to provide a multi-level configuration more than two levels in the same manner.

Figure 6:
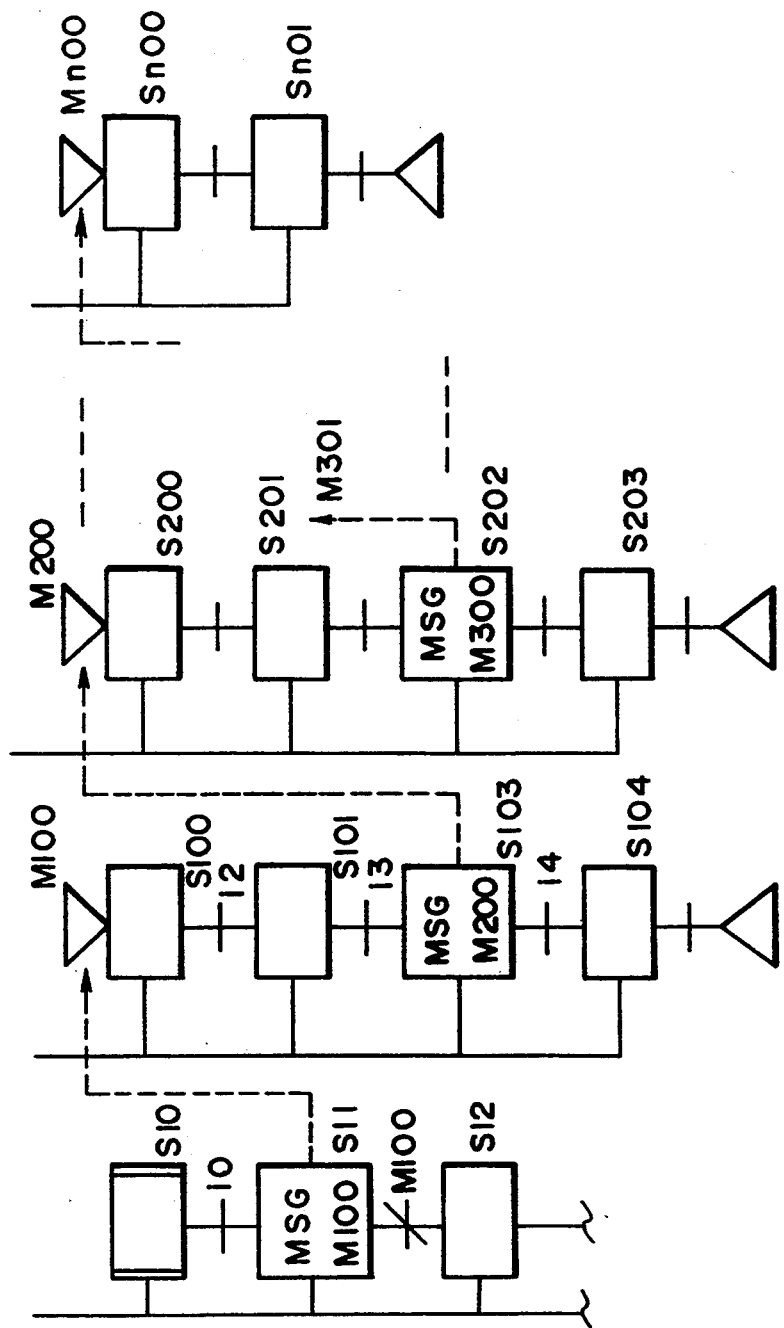
FIGS. 6 and 7 are flowcharts conceptually illustrating the operations of other embodiments of the present invention respectively.

FIG. 6 is a conceptual diagram of another embodiment of the present invention. An (n+1)-level configuration is provided in this embodiment, in which for example, if "1" is set into a status ST of a macro-block M100 by a command "MSG S11 M100" in the highest-level, the macro-block M100 lower in level than it is made to perform operation, or if the status ST of the macro-block M100 is reset the operation of the macro-block M100 is forbidden.

In this macro-block M100, if "1" is set into a status ST of a macro-block M200 by the command "MSG S103 M200", the lower-level macro-block M200 is made to perform operation, and if the status ST of the macro-block M200 is reset, the operation of the macro-block M200 is forbidden.

As has been described above, a macro-block positioned in a relatively higher level can control the operation of macro-blocks positioned in levels lower than the first-mentioned macro-block. In the embodiment of FIG. 6, if the status ST of the stage S11 is reset to reset the status ST of the macro-block M100, all the statuses of macro-blocks lower in levels than the macro-block M100 are reset, and their operations are not performed.

Figure 7:
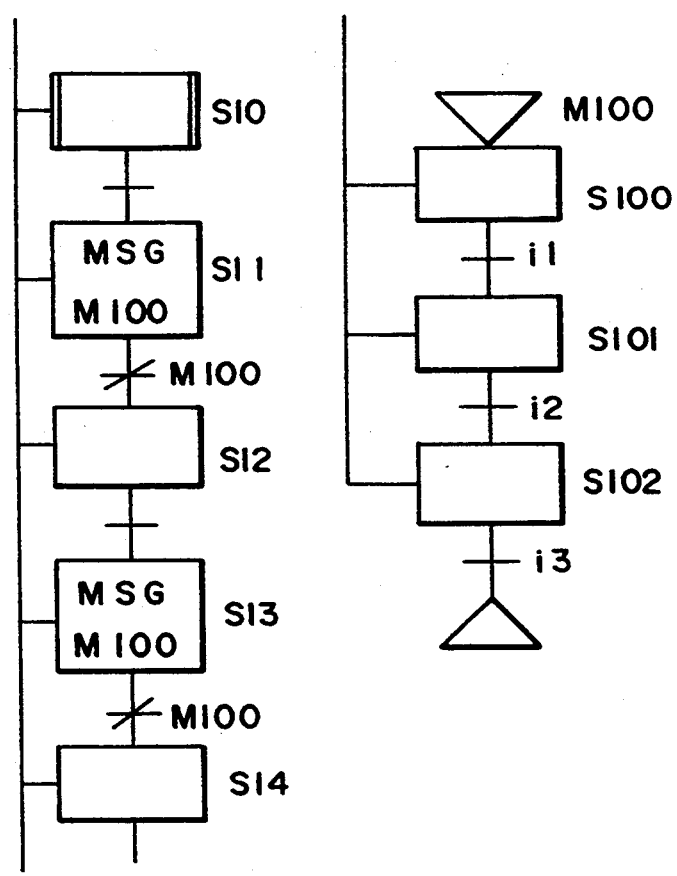

FIG. 7 is a conceptual diagram of another embodiment of the present invention. A macro-block M100 is used as a subroutine in this embodiment. If "1" is set into a status of a stage S11, "1" is also set into the status of the macro-block M100, so that the operation of the macro-block M100 is executed. On the contrary, if the status ST of the stage S11 is reset, the status ST of the macro-block M100 is also reset so that the operation of the macro-block M100 is forbidden to be executed. Such processing is performed also in a stage S13 in the same manner.

We claim:

1. A controlled method for operating a programmable controller containing a program storage section including memory means in which a plurality of programs are stored with each program including a stage having a master reset flag and consisting of one or more control programs and a macro-block consisting of a plurality of stages, said method comprising the steps of:
    reading out from said memory means a series of said programs corresponding in a direct relationship to a plurality of said stages designated by stage number in a controlling unit and in a predetermined sequence for performing control functions when the control programs in each stage are executed,
    detecting the relationship between the master reset flag for each stage and the stage status, and
    executing the control programs in each stage upon detecting the condition when the master reset flag for each stage is reset and the stage status is set.

2. A controlled method for operating a programmable controller as defined in claim 1 further including a plurality of macro-blocks with each macro-block having a macro-block status flag, said method further comprising the steps of:
    setting or resetting a macro-block status flag corresponding to a subsequent macro-block for a plurality of stages following the eventual program being read out from said memory means;
    resetting said master reset flag for the stage identifying the beginning of said subsequent macro-block on the condition that said subsequent macro-block is set, and setting said master reset flag for the stage at the beginning of the subsequent macro-block on the condition that said subsequent macro-block status is reset; and
    executing the plurality of stages included in the subsequent macro-block when said status for said subsequent macro-block is set and said master reset flag for said stage is reset.

3. A controlled method of operating a programmable controller as defined in claim 2 containing a plurality of said macro-blocks with each consisting of a plurality of stages further comprising the steps of:
    resetting or setting said master reset flag for a stage at the beginning of another macro-block following in succession from said subsequent macro-block on the condition that the status of said another macro-block is set or reset while the plurality of stages included in the previous macro-block are being executed;
    executing a plurality of stages included in said another macro-block when the status for said another macro-block is set and said master reset flag for a stage is reset.

* * * * *